March 28, 1933. G. C. EASTER 1,902,841
PROCESS OF FORMING NUT BAR FOR THE MANUFACTURE OF GRIP
NUTS AND APPARATUS FOR PERFORMING THE SAME
Filed July 30, 1928

INVENTOR
BY George C. Easter
William W. Varney
ATTORNEY

Patented Mar. 28, 1933

1,902,841

UNITED STATES PATENT OFFICE

GEORGE C. EASTER, OF BALTIMORE, MARYLAND, ASSIGNOR, BY MESNE ASSIGNMENTS, TO THE VULCAN STEEL PRODUCTS COMPANY, OF BALTIMORE, MARYLAND, A CORPORATION OF MARYLAND

PROCESS OF FORMING NUT BAR FOR THE MANUFACTURE OF GRIP NUTS AND APPARATUS FOR PERFORMING THE SAME

Application filed July 30, 1928. Serial No. 296,191.

This invention relates to an improved method of forming nut bars for the production of grip nuts of the type comprising superimposed nut portions connected together by a resilient yoke, and has in view to provide a method for rapidly and economically forming nut bar blanks of novel form whereby the nuts produced therefrom are of relatively low cost and possess tenacious gripping qualities.

With the foregoing general purpose in view, the invention consists in the novel steps employed in practicing the method as will be hereinafter more fully described, illustrated in the accompanying drawing and defined in the appended claims.

In the drawing, wherein like characters of reference refer to corresponding parts throughout the several views:—

Figure 4:
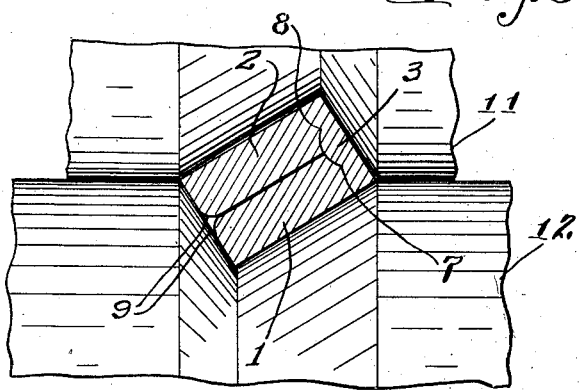
Fig. 4 is a similar view illustrating the fourth step of the method.

As illustrated in Fig. 4 of the drawing, a nut bar produced in accordance with the present method comprises superimposed nut sections designated as 1 and 2 resiliently connected together along adjacent edges thereof by a yoke formation 3. As will be understood, the nut bar is of elongated form and the nuts are formed by shearing the bar into nut lengths and either simultaneously or thereafter punching and threading the individual nut blanks, the result being that each nut is composed of superimposed, resiliently connected nut portions which have a tendency to firmly grip a stud, bolt or the like with which the nut may be engaged.

The present method is concerned only with the forming of a nut bar of the foregoing character, as the forming of the individual nuts from the bar may be accomplished in any desired manner, and said method involves, essentially, subjecting a bar of preferably flat stock to a series of passes between rolls of different contour, whereby the bar of stock may be progressively folded rapidly, accurately, and economically into the final form aforementioned with special provision for connecting the superimposed nut sections of the bar together to afford relatively great resiliency therebetween and to permit repeated use of the nuts formed therefrom without danger of the superimposed nut portions breaking apart from one another.

Figure 1:
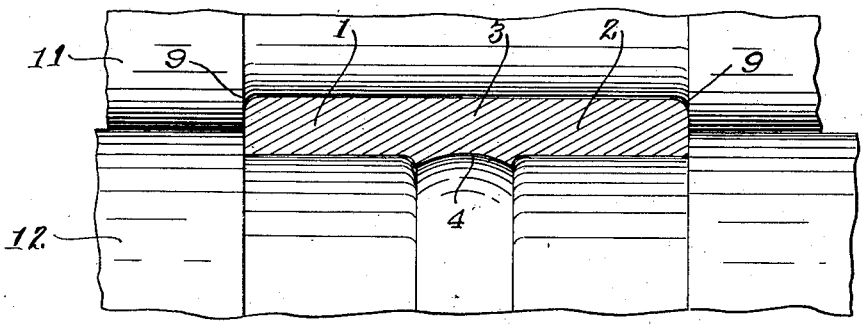
Fig. 1 is a cross sectional view illustrating the first step in producing a nut bar according to the present method.

In practicing the present method, the first step, although not absolutely essential, preferably consists in passing a bar of preferably flat stock between a pair of rolls, one of which is of such contour as to produce, midway between the side edges of the bar and in one side face thereof, a transversely concave depression 4 extending throughout the length of the bar. This is illustrated in Fig. 1 of the drawing, and the purpose of the depression 4 is to facilitate the forming by the subsequent steps of the method, of a flat outer face on the side of the finished nut bar comprised by the medial or yoke portion 3 of the bar, since in the absence of the depression 4 folding of the bar into superimposed relation would tend to cause the outer face of the medial or yoke portion 3 to bulge outward with consequent disadvantages in flattening said face.

Figures 2, 3:
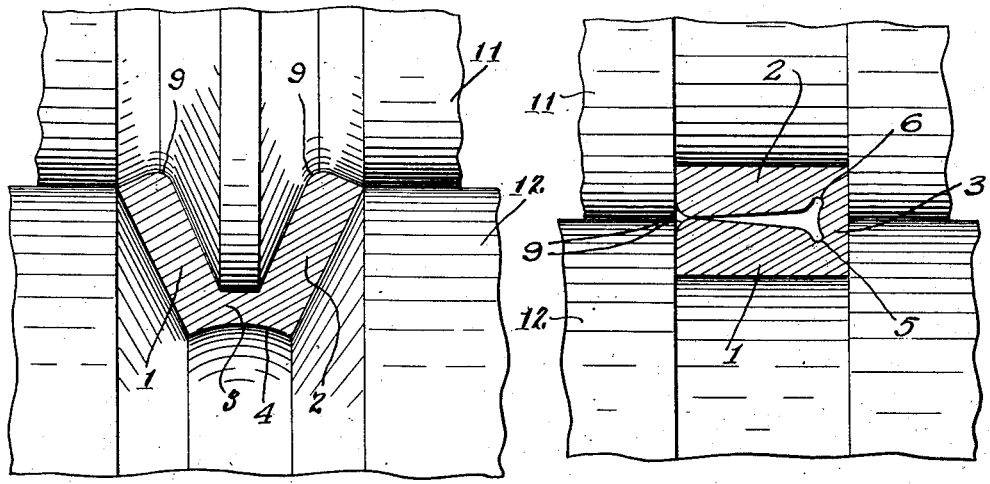
Fig. 2 is a similar view illustrating the second step of the method.
Fig. 3 is a similar view illustrating the third step of the method.

The next step of the method is illustrated in Fig. 2 of the drawing and consists in passing the bar between a pair of rolls having male and female formations which cooperate to initiate folding of the two half-sections 1 and 2 of the bar into superimposed relation. According to this second step of the method, a substantially V-shaped cross section is imparted to the bar with the inner faces of the sections 1 and 2 spaced apart at the points or corners where they meet the inner face of the medial or yoke portion 3, and at the same time the thickness of each of the sections 1 and 2 preferably is progressively decreased from its free edge toward the yoke portion 3.

The next step of the method is illustrated in Fig. 3 of the drawing and consists in passing the bar between a pair of cylindrical rolls to squeeze the sections 1 and 2 together. As the bar of the cross section produced by the second step of the method enters between the rolls for carrying out the third step of the method, the sections 1 and 2 are initially folded from their divergent relation illustrated in Fig. 2 to a superimposed substantially parallel relation, and then are squeezed together until the inner faces of the superimposed sections contact or substantially contact with one another adjacent their outer edges where said sections are of maximum thickness. By the folding of the sections into substantially parallel relation, the depression 3 becomes filled out and substantially flat, while the squeezing of the sections together results, in part because of the resistance to compression offered by the yoke portion 3 and in part to the reduced thickness of the sections 1 and 2 at their points of juncture with said yoke portion, in the metal of the bar in substance rolling or folding upon itself at the corners where the portions 1 and 2 join the yoke portion 3, thereby leaving voids 5 and 6 at these points.

By the fourth and final step of the method illustrated in Fig. 4, the bar, formed in accordance with the third step of the method, is passed between a pair of rolls to squeeze the inner faces of the portions 1 and 2 into surface contact with one another, which results in closing of the voids 5 and 6 and the consequent formation of so-called "cold shots" or fissures 7 and 8 diverging from the inner ends of the inner faces of the portions 1 and 2 toward the adjacent outer corners of the bar, respectively. By reason of these fissures, relatively great resiliency is imparted to the connection between the portions 1 and 2, and at the same time said fissures afford means whereby the portions 1 and 2 may repeatedly be sprung apart without danger of said portions breaking apart from one another, so that nuts formed from said bar possess a tenacious grip and are susceptible of repeated use.

It will be observed that in the rolling of the bar the inner corners of the sections 1 and 2 at the free edges of said sections are rounded or chamfered as indicated at 9 to facilitate the entrance of a tool between said sections for the purpose of spreading them apart either prior to or after punching and threading of the individual nuts.

Without further description it is thought that the features and advantages of the invention will be readily apparent to those skilled in the art to which the invention appertains. It is desired to point out, however, that while a specific manner of carrying the method in practice has been illustrated and described, the method may be varied in different respects within the spirit and scope of the invention as defined in the appended claims.

I claim:—

1. The method of forming a nut bar from which individual nuts are adapted to be cut punched and threaded, which consists in subjecting a bar of metal stock, to successive passes between differently shaped rolls to progressively fold different portions of the bar into superimposed relation, and then subjecting the bar to pressure between rolls to squeeze the superimposed portions together to eliminate the space between said portions.

2. The method of forming a nut bar which consists in rolling a bar of metal stock to produce a medial longitudinally extending transversely concave recess in one side face of the bar, and subjecting the bar to a series of passes between differently shaped rolls to progressively fold the portions of the bar to either side of said recess into superimposed relation with the recessed face of the bar disposed outwardly.

3. The method of forming a nut bar which consists in rolling a bar of metal stock to progressively fold different portions of the bar into superimposed relation and to form a yoke portion connecting adjacent edge portions of said superimposed portions, reducing the thickness of the superimposed portions from their free edges toward said yoke, and squeezing said superimposed portions together to form cold shots diverging from the points of juncture of the inner faces of the superimposed portions with the yoke portion toward the adjacent outer corners of the bar, respectively.

4. The method of forming a nut bar which consists in rolling a bar of metal stock to produce a medial longitudinally extending transversely concave recess in one side face of the bar, and subjecting the bar to a series of passes between differently shaped rolls to progressively fold the portions of the bar to either side of said recess into superimposed relation with the recessed face of the bar disposed outwardly, and simultaneously reducing the thickness of the superimposed portions from their free edges toward their connected edges, and subsequently rolling the bar to squeeze said superimposed portions together.

GEORGE C. EASTER.